US012794713B2

(12) United States Patent
Golden et al.

(10) Patent No.: US 12,794,713 B2
(45) Date of Patent: Nov. 10, 2026

(54) SYSTEMS AND METHODS FOR PUBLIC KEY INFRASTRUCTURE

(71) Applicant: Rockwell Automation Technologies, Inc., Mayfield Heights, OH (US)

(72) Inventors: Diane E. Golden, West Allis, WI (US); Taryl J. Jasper, Concord Township, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 300 days.

(21) Appl. No.: 18/473,839

(22) Filed: Sep. 25, 2023

(65) Prior Publication Data

US 2025/0106044 A1 Mar. 27, 2025

(51) Int. Cl.
*H04L 9/32* (2006.01)

(52) U.S. Cl.
CPC .......... *H04L 9/3268* (2013.01); *H04L 9/3247* (2013.01); *H04L 9/3265* (2013.01)

(58) Field of Classification Search
CPC ... H04L 9/3268; H04L 9/3247; H04L 9/3265; H04L 9/3263
See application file for complete search history.

(56) References Cited

U.S. PATENT DOCUMENTS

| | | | | |
|---|---|---|---|---|
| 9,806,891 | B2 | 10/2017 | Schmirler et al. | |
| 10,097,585 | B2 | 10/2018 | Bush et al. | |
| 2018/0323977 | A1* | 11/2018 | Hojsik | H04L 67/12 |
| 2020/0302441 | A1* | 9/2020 | Collinge | H04L 9/0869 |
| 2020/0410080 | A1* | 12/2020 | Lutz | H04L 9/3265 |

FOREIGN PATENT DOCUMENTS

| | | | | |
|---|---|---|---|---|
| EP | 2919414 | A1 * | 9/2015 | H04L 9/321 |

* cited by examiner

*Primary Examiner* — Matthew T Henning
(74) *Attorney, Agent, or Firm* — Fletcher Yoder, P.C.

(57) ABSTRACT

A method includes receiving, at a certificate authority, from a first organization in possession of an operational technology (OT) device, a first certificate signing request and a public key, verifying the first certificate signing request, generating, a certificate, transmitting the certificate to the first organization for storage in memory of the OT device along with the public key, receiving, from a second organization in possession of the OT device, a second certificate signing request and the public key, verifying one or more second pieces of information in the second certificate signing request, generating a new certificate, and transmitting the new certificate to the second organization for storage in memory of the OT device along with the public key.

20 Claims, 8 Drawing Sheets

SYSTEMS AND METHODS FOR PUBLIC KEY INFRASTRUCTURE

BACKGROUND

The present disclosure generally relates to tools for managing public key infrastructure (PKI) in operational technology (OT) environments.

Industrial automation systems may be used to provide automated control of one or more actuators in an industrial setting. OT networks may be used to communicatively couple industrial automation systems and/or industrial automation components within an industrial automation system. Policies may dictate access to and operation of OT devices within the OT network. Policies may be implemented within an OT network using a system of certificates and cryptographic keys stored on devices, collectively referred to as public key infrastructure (PKI). However, some organizations that operate OT devices may not have the capability or desire to manage a PKI for their OT devices. Further, third parties, such as industrial device manufacturers, machine builders, system integrators, distributors, service providers, etc. may have trouble interfacing with a public key infrastructure managed by end users, especially if the third party must interface with different PKIs managed by multiple different customers. Accordingly, improved techniques for managing PKI across multiple organizations are desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system comprises processing circuitry and a memory, accessible by the processing circuitry, the memory storing instructions that, when executed by the processing circuitry, cause the processing circuitry to perform operations including determining that a certificate stored on an operational technology (OT) device operating in an OT environment has expired, is within a threshold period of time from expiration, or has been revoked, generating a certificate signing request for a new certificate for the OT device, transmitting the certificate signing request and a public key stored in a second memory of the OT device to a certificate authority, receiving the new certificate from the certificate authority, and transmitting the new certificate to the OT device for storage in the second memory.

In another embodiment, a method includes receiving, at a certificate authority, from a first organization in possession of an operational technology (OT) device, a first certificate signing request and a public key, verifying the first certificate signing request, generating, a certificate, transmitting the certificate to the first organization for storage in memory of the OT device along with the public key (e.g., a PKI public key or a device public key), receiving, from a second organization in possession of the OT device, a second certificate signing request and the public key, verifying one or more second pieces of information in the second certificate signing request, generating a new certificate, and transmitting the new certificate to the second organization for storage in memory of the OT device along with the public key.

In a further embodiment, a non-transitory computer readable medium storing instructions that, when executed by processing circuitry, cause the processing circuitry to perform operations including generating a certificate signing request for a certificate for an operational technology (OT) device based on an order placed by an end user, wherein the certificate signing request comprises identification of a name, identification of an organization, identification of a public key, identification of a domain name, one or more digital signatures, or any combination thereof, transmitting the certificate signing request and a public key stored in a memory of the OT device to a certificate authority, receiving the certificate from the certificate authority, and transmitting the certificate to the OT device for storage in the memory.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
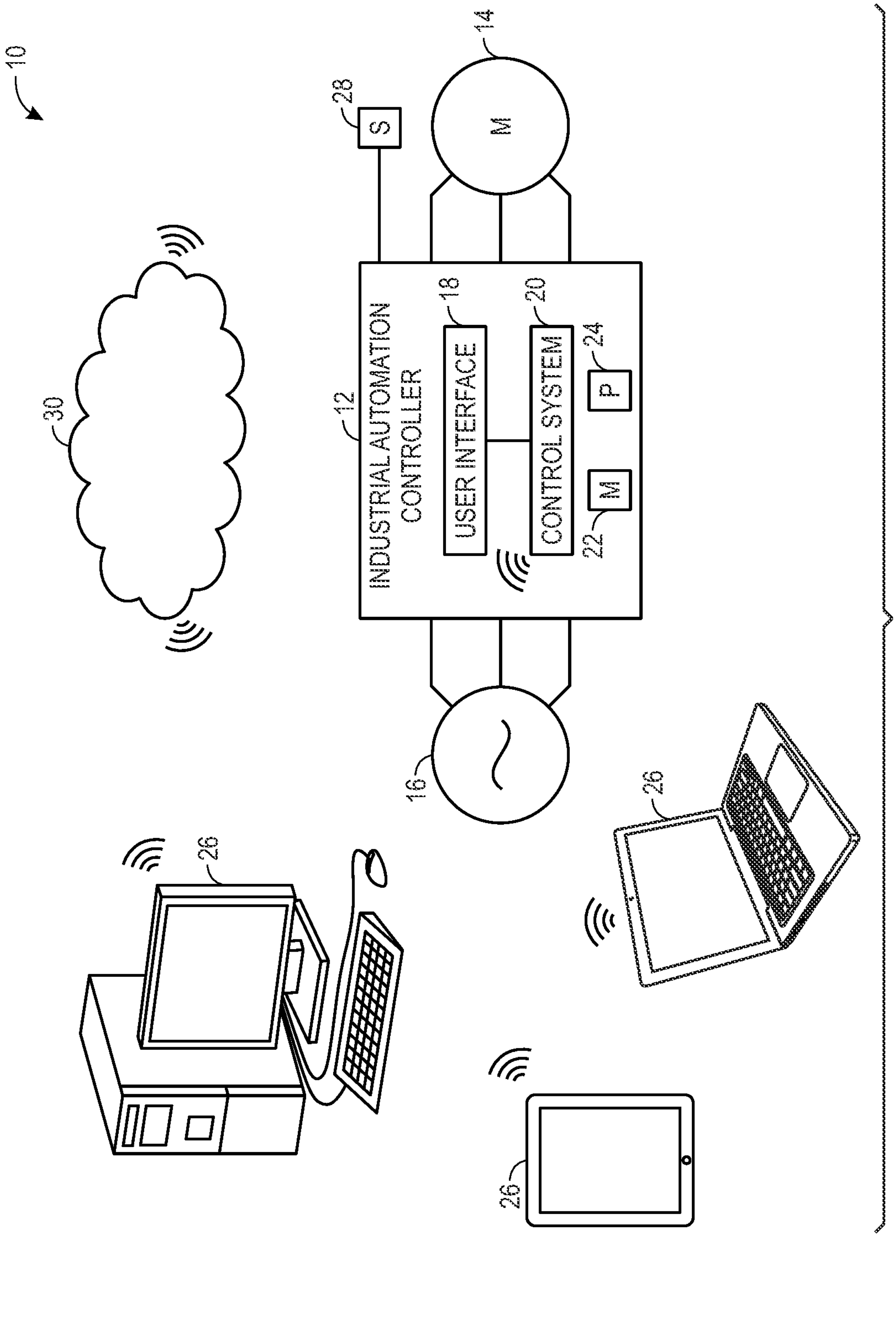
FIG. 1 is a schematic view of an industrial automation system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As industrial devices (e.g., operational technology devices or "OT" devices) become more capable and connected, keeping industrial devices secure becomes a more complex proposition. Various protocols are becoming more prevalent for securing industrial devices using public key infrastructure. However, some enterprises that operate industrial devices may not have the capability or desire to manage a public key infrastructure for their industrial devices. Further, third parties, such as industrial device manufacturers, machine builders, system integrators, distributors, service providers, etc. may have trouble interfacing with a public key infrastructure managed by end users, especially if the third party must interface with different PKI managed by multiple different customers. Accordingly, the present patent application is directed to a cloud-based PKI managed by a third party (e.g., Rockwell Automation via a cloud hosted service, such as FactoryTalk Hub) and provided to customers as a service.

A machine builder (e.g., a manufacturer of industrial equipment) or system integrator can provision industrial equipment for its intended use (e.g., tied to one or more particular zones and/or conduits) based on inputs provided by the end user when the order is placed. The machine builder can obtain a certificate (e.g., an X.509 certificate) from a certificate authority by sending a certificate signing request and a public key to the certificate authority or generate, via its own certificate authority, a certificate. The certificate may be referenced by a policy platform to determine other devices with which the industrial device can communicate, zones and/or conduits in which the industrial device may operate, who can use and/or modify the industrial device, and so forth. For example, the certificate may define a zone or conduit including multiple industrial devices that share certificates. In some cases, the certificate may be used by the device manufacturer, or some other party in the distribution chain, such as a distributor (e.g., a seller of OT devices), integrator (e.g., an entity that purchases disparate components and/or subsystems, integrates the disparate components and/or subsystems into a working system, and provides the resultant system to an end user), service/maintenance provider (e.g., a entity hired by the end user to perform service and/or maintenance on OT devices), etc. to retain certain rights in the industrial device. For example, the machine builder may provision a zone or conduit with which the end user or other parties are not authorized to interact. In other embodiments, the machine builder may generate certificates to define multiple access levels that may be enforced via separate security zones and/or conduits. The certificate may be configured to expire on a set expiration date or after a set period of time has elapsed (e.g., a year from issuance, at the end of the calendar year, etc.). Accordingly, the certificate must be renewed or a new certificate obtained to use the industrial device after the certificate expires or has been revoked. The certificate may be stored on the industrial device along with the corresponding private key. The industrial device can then be transported to the end user in a secure state (e.g., the industrial device may only be used in accordance with the zones and/or conduits determined by the security policy management engine and set forth in the certificate).

Once the industrial device arrives at the end user, the end user can install and use the industrial device in a zone and/or conduit that is consistent with the certificate. For example, the industrial device may be allowed to communicate with certain other devices within a zone and/or conduit and/or perform certain operations that are consistent with the certificate. Upon installation of the industrial device or expiration of the existing certificate, an on-prem client application (e.g., a policy manager application) may be configured to transmit a certificate signing request, along with a public key associated with the device, to the certificate authority requesting a new certificate or renewal of the existing certificate. The certificate authority enforces role-based access controls, enabling authorized users to set policies and monitor certificate status and may be based on a root certificate authority housed offline. The certificate authority confirms the certificate signing request, that the certificate signing request was generated with the private key associated with the public key, and, in some cases, the public key itself, and issues a certificate to the on-prem client application. If the existing certificate is not renewed and a new certificate is not issued, the existing certificate is allowed to expire. Further, if trust is lost, the certificate authority may revoke the certificate before the certificate expires. Once the certificate expires or is revoked, the other industrial devices in the zone and/or conduit as the industrial device may refuse to communicate with the industrial device or may limit communication with the industrial device until a valid certificate is obtained. In some embodiments, the use of an industrial device with an expired certificate may result in security event notices notifying an end user of the expired certificate, but giving the end user the option to continue operating the industrial device. Further, in some cases, the PKI as a service may be configured to provide reminders to renew certificates or request new certificates when existing certificates are nearing expiration.

The on-prem client application acts as an intermediary in the certificate chain by receiving the certificate from the certificate authority and transmitting the certificate to the industrial device. As such, the on-prem client application may be synchronized or otherwise share a sense of time with the certificate authority in order to identify when certificates are valid, nearing expiration, have expired, or have been revoked. In some cases, the on-prem client application may issue an additional certificate. Though the on-prem client application is described as being a single intermediary between the industrial device and the certificate authority, it should be understood that, in some cases, there may be multiple intermediaries (e.g., multiple on-prem client applications running on one or more devices) between the industrial device and the certificate authority. Correspondingly, if the industrial device is connected to the cloud, the industrial device may be capable of direct communication with the certificate authority. In such cases, the on-prem client application may run on the industrial device itself.

The cloud-based PKI as a service may be utilized to facilitate the transfer of ownership, custody, and/or other rights in an industrial device between multiple parties. Further, though the scenario described above includes a machine builder, an end user, and, in some cases, one or more intervening parties. It should be understood that these techniques may be utilized to include other parties in the distribution chain, such as distributors, integrators, installers, shippers, service providers, etc. In the event of encryption being broken (e.g., via a hack, loss of a private key, or by a quantum computer via a "quantum apocalypse"), certain cryptographic algorithms being found insufficiently secure, the PKI as a service may be utilized to coordinate rapid certificate updates and deployments across enterprise fleets. Additional details with regard to managing PKI in accordance with the techniques described above will be provided below with reference to FIGS. 1-8.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger industrial automation system 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22, such as a non-transitory computer readable medium, and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the industrial automation system 10. With feedback data from the sensors 28, the control system 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis.

The computing device 26 may be communicatively coupled to the controller 12 via a wired or wireless connection. The computing device 26 may receive inputs from a user defining an industrial automation project using a native application running on the computing device 26 or using a website accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the industrial automation system 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. The controller 12 may collect feedback data during execution of the project, and the feedback data may be provided back to the computing device 26 for analysis. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, develop policies, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
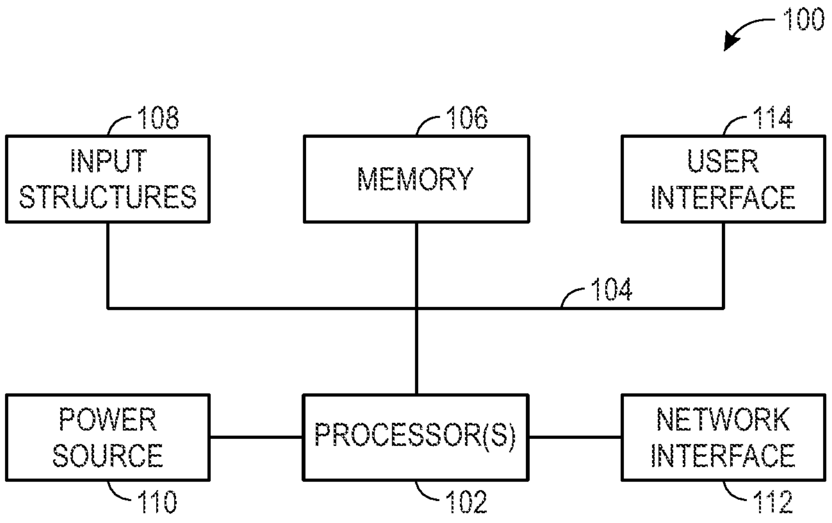
FIG. 2 is a block diagram of example components that could be used in the industrial automation system of FIG. 1, in accordance with embodiments presented herein.

FIG. 2 illustrates a block diagram of example components of a computing device 100 that could be used as the computing device 26, the cloud/remote server 30, the controller 12, or some other device within the system 10 shown in FIG. 1. As used herein, a computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 108, a power source 110, a network interface 112, a user interface 114, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 108 may allow a user to input data and/or commands to the device 100 and may include mice, touchpads, touchscreens, keyboards, controllers, and so forth. The power source 110 can be any suitable source for providing power to the various components of the computing device 100, including line and battery power. In the depicted example, the device 100 includes a network interface 112. Such a network interface 112 may allow communication with other devices on a network using one or more communication protocols. In the depicted example, the device 100 includes a user interface 114, such as a display that may display images or data provided by the one or more processors 102. The user interface 114 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Figure 3:
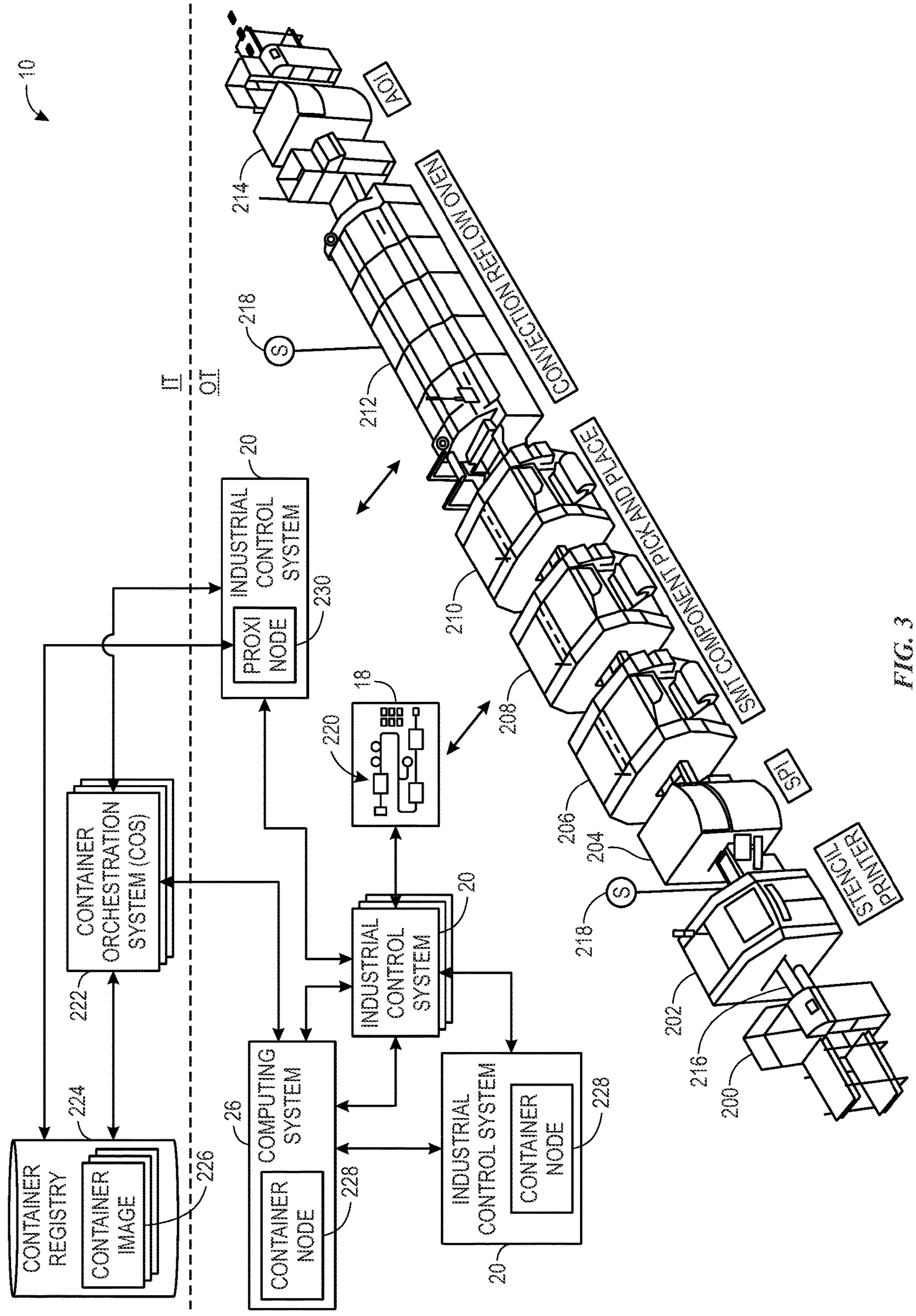
FIG. 3 is a perspective view of an example of the industrial automation system of FIG. 1 controlled by an industrial control system, in accordance with an embodiment.

FIG. 3 is a perspective view of an example of the industrial automation system 10 of FIG. 1. The industrial automation system 10 includes stations 200, 202, 204, 206, 208, 210, 212, 214 having machine components and/or machines to conduct functions within an automated process, such as printed circuit board assembly, as is depicted. The automated process may begin at a station 200 used for loading objects, such as substrates, into the industrial automation system 10 via a conveyor section 216. For example, objects may be transported along the conveyor section 216 to station 202 to perform a first action, such a printing solder paste to the substrate via stenciling. As objects exit from the station 202, the objects may be transported via the conveyor section 216 to a station 204 for solder paste inspection (SPI) to inspect printer results, to a station 206, 208, and 210 for surface mount technology (SMT) component placement, to a station 212 for convection reflow oven to melt the solder to make electrical couplings, and finally to a station 214 for automated optical inspection (AOI) to inspect the object manufactured (e.g., the manufactured printed circuit board). After the objects proceed through the various stations, the objects may be removed from the station 214, for example, for storage in a warehouse or for shipment. It should be understood, however, that, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of OT data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 200, 202, 204, 206, 208, 210, 212, 214, may be monitored and controlled by the industrial control systems 20 for regulating control variables. For example, sensing devices (e.g., sensors 218) may monitor various properties of the industrial automation system 10 and may be used by the industrial control systems 20 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 20 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 20 may include or be communicatively coupled to the display/operator interface 18 (e.g., a human-machine interface (HMI)) and to devices of the industrial automation system 10. It should be understood that any suitable number of industrial control systems 20 may be used in a particular industrial automation system 10 embodiment. The industrial control systems 20 may facilitate representing components of the industrial automation system 10 through programming objects that may be instantiated and executed to provide simulated functionality similar or identical to the actual components, as well as visualization of the components, or both, on the display/operator interface 18. The programming objects may include code and/or instructions stored in the industrial control systems 20 and executed by processing circuitry of the industrial control systems 20. The processing circuitry may communicate with memory circuitry to permit the storage of the component visualizations.

As illustrated, a display/operator interface 18 may be configured to depict representations 220 of the components of the industrial automation system 10. The industrial control system 20 may use data transmitted by the sensors 218 to update visualizations of the components via changing one or more statuses, states, and/or indications of current operations of the components. These sensors 218 may be any suitable device adapted to provide information regarding process conditions. Indeed, the sensors 218 may be used in a process loop (e.g., control loop) that may be monitored and controlled by the industrial control system 20. As such, a process loop may be activated based on process inputs (e.g., an input from the sensor 218) or direct input from a person via the display/operator interface 18. The person operating and/or monitoring the industrial automation system 10 may reference the display/operator interface 18 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 218 may gather OT data indicative of one or more operations of the industrial automation system 10 or the industrial control system 20. In this way, the OT data may be analog data or digital data indicative of measurements, statuses, alarms, or the like associated with operation of the industrial automation system 10 or the industrial control system 20.

The industrial control systems 12 described above may operate in an OT space in which OT data is used to monitor and control OT assets, such as the equipment illustrated in the stations 200, 202, 204, 206, 208, 210, 212, 214 of the industrial automation system 10 or other industrial equipment. The OT space, environment, or network generally includes direct monitoring and control operations that are coordinated by the industrial control system 20 and a corresponding OT asset. For example, a programmable logic controller (PLC) may operate in the OT network to control operations of an OT asset (e.g., drive, motor, and/or high-level controllers). The industrial control systems 20 may be specifically programmed or configured to communicate directly with the respective OT assets.

A container orchestration system 222, on the other hand, may operate in an information technology (IT) environment. That is, the container orchestration system 222 may include a cluster of multiple computing devices that coordinates an automatic process of managing or scheduling work of individual containers for applications within the computing devices of the cluster. In other words, the container orchestration system 222 may be used to automate various tasks at scale across multiple computing devices. By way of example, the container orchestration system 222 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 222 may use configuration files to determine a network protocol to facilitate communication between containers, a storage location to save logs, and the like. The container orchestration system 222 may also schedule deployment of containers into clusters and identify a host (e.g., node) that may be best suited for executing the container. After the host is identified, the container orchestration system 222 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 224 as container images 226. The container registry 224 may be any suitable data storage or database that may be accessible to the container orchestration system 222. The container image 226 may correspond to an executable software package that includes the tools and data employed to execute a respective application. That is, the container image 226 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 222. The deployment configuration file may be stored in the container registry 224 along with the respective container images 226 associated with the deployment configuration file. The deployment configuration file may include a list of different pods and a number of replicas for each pod that should be operating within the container orchestration system 222 at any given time. Each pod may correspond to a logical unit of an application, which may be associated with one or more containers. The container orchestration system 222 may coordinate the distribution and execution of the pods listed in the deployment configuration file, such that the desired state is continuously met. In some embodiments, the container orchestration system 222 may include a master node that retrieves the deployment configuration files from the container registry 224, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 222 may include a cluster of computing devices, computing systems, or container nodes that may work together to achieve certain specifications or states, as designated in the respective container. In some embodiments, container nodes 228 may be integrated within industrial control systems 20 as shown in FIG. 3. That is, container nodes 228 may be implemented by the industrial control systems 20, such that they appear as worker nodes to the master node in the container orchestration system 222. In this way, the master node of the container orchestration system 222 may send commands to the container nodes 228 that are also configured to perform applications and operations for the respective industrial equipment.

With this in mind, the container nodes 228 may be integrated with the industrial control systems 20, such that they serve as passive-indirect participants, passive-direct participants, or active participants of the container orchestration system 222. As passive-indirect participants, the container nodes 228 may respond to a subset of all of the commands that may be issued by the container orchestration system 222. In this way, the container nodes 228 may support limited container lifecycle features, such as receiving pods, executing the pods, updating a respective filesystem to included software packages for execution by the industrial control system 20, and reporting the status of the pods to the master node of the container orchestration system 222. The limited features implementable by the container nodes 228 that operate in the passive-indirect mode may be limited to commands that the respective industrial control system 20 may implement using native commands that map directly to the commands received by the master node of the container orchestration system 222. Moreover, the container node 228 operating in the passive-indirect mode of operation may not be capable to push the packages or directly control the operation of the industrial control system 20 to execute the package. Instead, the industrial control system 20 may periodically check the file system of the container node 228 and retrieve the new package at that time for execution.

As passive-direct participants, the container nodes 228 may operate as a node that is part of the cluster of nodes for the container orchestration system 222. As such, the container node 228 may support the full container lifecycle features. That is, container node 228 operating in the passive-direct mode may unpack a container image and push the resultant package to the industrial control system 20, such that the industrial control system 20 executes the package in response to receiving it from the container node 228. As such, the container orchestration system 222 may have access to a worker node that may directly implement commands received from the master node onto the industrial control system 20.

In the active participant mode, the container node 228 may include a computing module or system that hosts an operating system (e.g., Linux) that may continuously operate a container host daemon that may participate in the management of container operations. As such, the active participant container node 228 may perform any operations that the master node of the container orchestration system 222 may perform. By including a container node 228 operating in the OT space, the container orchestration system 222 is capable of extending its management operations into the OT space. That is, the container node 228 may provision devices in the OT space, serve as a proxy node 230 to provide bi-directional coordination between the IT space and the OT space, and the like. For instance, the container node 228 operating as the proxy node 230 may intercept orchestration commands and cause industrial control system 20 to implement appropriate machine control routines based on the commands. The industrial control system 20 may confirm the machine state to the proxy node 230, which may then reply to the master node of the container orchestration system 222 on behalf of the industrial control system 20.

Additionally, the industrial control system 20 may share an OT device tree via the proxy node 230. As such, the proxy node 230 may provide the master node with state data, address data, descriptive metadata, versioning data, certificate data, key information, and other relevant parameters concerning the industrial control system 20. Moreover, the proxy node 230 may issue requests targeted to other industrial control systems 20 to control other OT devices. For instance, the proxy node 230 may translate and forward commands to a target OT device using one or more OT communication protocols, may translate and receive replies from the OT devices, and the like. As such, the proxy node 230 may perform health checks, provide configuration updates, send firmware patches, execute key refreshes, and other OT operations for other OT devices.

Figure 4:
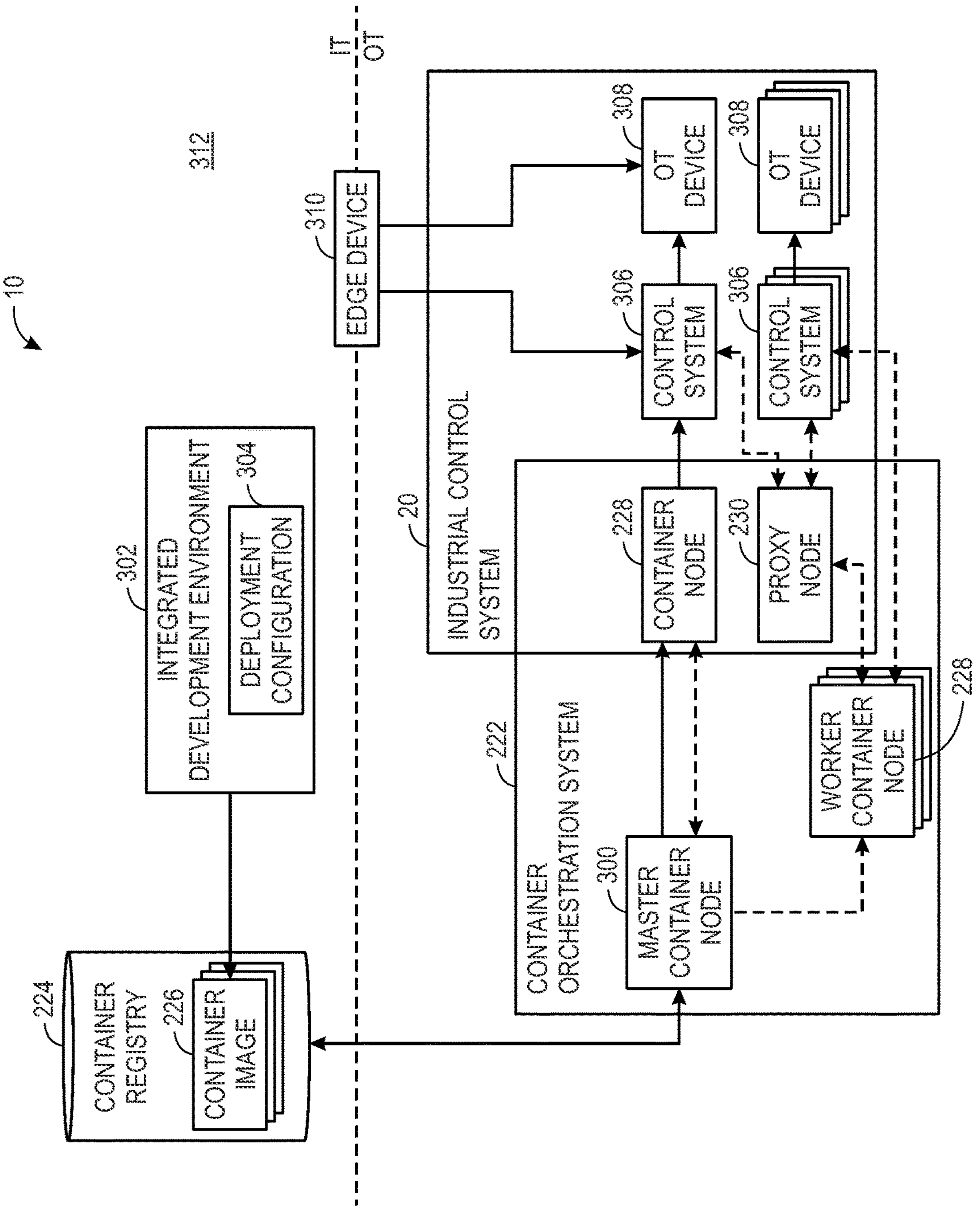
FIG. 4 is a block diagram of an example operational technology (OT) network, including the industrial control system of FIG. 3, that coordinates with a container orchestration system, in accordance with an embodiment.

FIG. 4 illustrates a block diagram that depicts the relative positions of the container node 228 and the proxy node 230 with respect to the container orchestration system 222. As mentioned above, the container orchestration system 222 may include a collection of nodes that are used to achieve a desired state of one or more containers across multiple nodes. As shown in FIG. 4, the container orchestration system 222 may include a master node 300 that may execute control plane processes for the container orchestration system 222. The control plane processes may include the processes that enable the container orchestration system 222 to coordinate operations of the container nodes 228 to meet the desired states. As such, the master container node 300 may execute an applications programming interface (API) for the container orchestration system 222, a scheduler component, core resource controllers, and the like. By way of example, the master container node 300 may coordinate all of the interactions between nodes of the cluster that make up the container orchestration system 222. Indeed, the master container node 300 may be responsible for deciding the operations that will run on container nodes 228 including scheduling workloads (e.g., containerized applications), managing the workloads' lifecycle, scaling, and upgrades, managing network and storage resources for the workloads, and the like. The master container node 300 may run an API server to handle requests and status updates received from the container nodes 228.

By way of operation, an integrated development environment (IDE) tool 302 may be used by an operator to develop a deployment configuration file 304. As mentioned above, the deployment configuration file 304 may include details regarding the containers, the pods, constraints for operating the containers/pods, and other information that describe a desired state of the containers specified in the deployment configuration file 304. In some embodiments, the deployment configuration file 304 may be generated in a YAML file, a JSON file, or other suitable file format that is compatible with the container orchestration system 222. After the IDE tool 302 generates the deployment configuration file 304, the IDE tool 302 may transmit the deployment configuration file 304 to the container registry 224, which may store the file along with container images 226 representative of the containers stored in the deployment configuration file 304.

In some embodiments, the master container node 300 may receive the deployment configuration file 304 via the container registry 224, directly from the IDE tool 302, or the like. The master container node 300 may use the deployment configuration file 304 to determine a location to gather the container images 226, determine communication protocols to use to establish networking between container nodes 228, determine locations for mounting storage volumes, locations to store logs for the containers, and the like.

Based on the desired state provided in the deployment configuration file 304, the master container node 300 may deploy containers to the container host nodes 228. That is, the master container node 300 may schedule the deployment of a container based on constraints (e.g., CPU or memory availability) provided in the deployment configuration file 304. After the containers are operating on the container nodes 228, the master container node 300 may manage the lifecycle of the containers to ensure that the containers specified by the deployment configuration file 304 are operating according to the specified constraints and the desired state.

Keeping the foregoing in mind, the industrial control system 20 may not use an operating system (OS) that is compatible with the container orchestration system 222. That is, the container orchestration system 222 may be configured to operate in the IT space that involves the flow of digital information. In contrast, the industrial control system 20 may operate in the OT space that involves managing the operation of physical processes and the machinery used to perform those processes. For example, the OT space may involve communications that are formatted according to OT communication protocols, such as FactoryTalk LiveData, EtherNet/IP, Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean). Because the industrial control systems 20 operate in the OT space, the industrial control systems may not be capable of implementing commands received via the container orchestration system 222.

In certain embodiments, the container node 228 may be programmed or implemented in the industrial control system 20 to serve as a node agent that can register the industrial control system 20 with the master container node 300. The node agent may or may not be the same as the proxy node 230 shown in FIG. 3. For example, the industrial control system 20 may include a PLC that cannot support an operating system (e.g., Linux) for receiving and/or implementing requested operations issued by the container orchestration system 222. However, the PLC may perform certain operations that may be mapped to certain container events. As such, the container node 228 may include software and/or hardware components that may map certain events or commands received from the master container node 300 into actions that may be performed by the PLC. After converting the received command into a command interpretable by the PLC, the container node 228 may forward the mapped command to the PLC that may implement the mapped command. As such, the container node 228 may operate as part of the cluster of nodes that make up the container orchestration system 222, while a first control system 306 (e.g., PLC) that coordinates the OT operations for a second OT device 308 in the industrial control system 12. The first control system 306 may include a controller, such as a PLC, an HLC, a programmable automation controller (PAC), or any other controller that may monitor, control, and operate an industrial automation device or component.

The OT device 308 may correspond to an industrial automation device or component. The OT device 308 may include any suitable industrial device that operates in the OT space. As such, the OT device 308 may be involved in adjusting physical processes being implemented via the industrial system 10. In some embodiments, the OT device 308 may include motor control centers, motors, HMIs, operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 308 may also be related to various industrial equipment such as mixers, machine conveyors, tanks, skids, specialized original equipment manufacturer machines, and the like. The OT device 308 may also be associated with devices used by the equipment such as scanners, gauges, valves, flow meters, and the like.

In the present embodiments described herein, the control system 306 may thus perform actions based on commands received from the container node 228. By mapping certain container lifecycle states into appropriate corresponding actions implementable by the control system 306, the container node 228 enables program content for the industrial control system 20 to be containerized, published to certain registries, and deployed using the master container node 300, thereby bridging the gap between the IT-based container orchestration system 222 and the OT-based industrial control system 20.

In some embodiments, the container node 228 may operate in an active mode, such that the container node may invoke container orchestration commands for other container nodes 228. For example, a proxy node 230 may operate as a proxy or gateway node that is part of the container orchestration system 222. The proxy node 230 may be implemented in a sidecar computing module that has an operating system (OS) that supports the container host daemon. In another embodiment, the proxy node 230 may be implemented directly on a core of the control system 306 that is configured (e.g., partitioned), such that the control system 306 may operate using an operating system that allows the container node 228 to execute orchestration commands and serve as part of the container orchestration system 222. In either case, the proxy node 230 may serve as a bi-directional bridge for IT/OT orchestration that enables automation functions to be performed in IT devices based on OT data and in OT devices 308 based on IT data. For instance, the proxy node 230 may acquire OT device tree data, state data for an OT device, descriptive metadata associated with corresponding OT data, versioning data for OT devices 308, certificate/key data for the OT device, and other relevant OT data via OT communication protocols. The proxy node 230 may then translate the OT data into IT data that may be formatted to enable the master container node 300 to extract relevant data (e.g., machine state data) to perform analysis operations and to ensure that the container orchestration system 222 and the connected control systems 306 are operating at the desired state. Based on the results of its scheduling operations, the master container node 300 may issue supervisory control commands to targeted OT devices via the proxy nodes 230, which may translate and forward the translated commands to the respective control system 306 via the appropriate OT communication protocol.

In addition, the proxy node 230 may also perform certain supervisory operations based on its analysis of the machine state data of the respective control system 306. As a result of its analysis, the proxy node 230 may issue commands and/or pods to other nodes that are part of the container orchestration system 222. For example, the proxy node 230 may send instructions or pods to other worker container nodes 228 that may be part of the container orchestration system 222. The worker container nodes 228 may corresponds to other container nodes 228 that are communicatively coupled to other control systems 306 for controlling other OT devices 308. In this way, the proxy node 230 may translate or forward commands directly to other control systems 306 via certain OT communication protocols or indirectly via the other worker container nodes 228 associated with the other control systems 306. In addition, the proxy node 230 may receive replies from the control systems 306 via the OT communication protocol and translate the replies, such that the nodes in the container orchestration system 222 may interpret the replies. In this way, the container orchestration system 222 may effectively perform health checks, send configuration updates, provide firmware patches, execute key refreshes, and provide other services to OT devices 308 in a coordinated fashion. That is, the proxy node 230 may enable the container orchestration system to coordinate the activities of multiple control systems 306 to achieve a collection of desired machine states for the connected OT devices 308.

Figure 5:
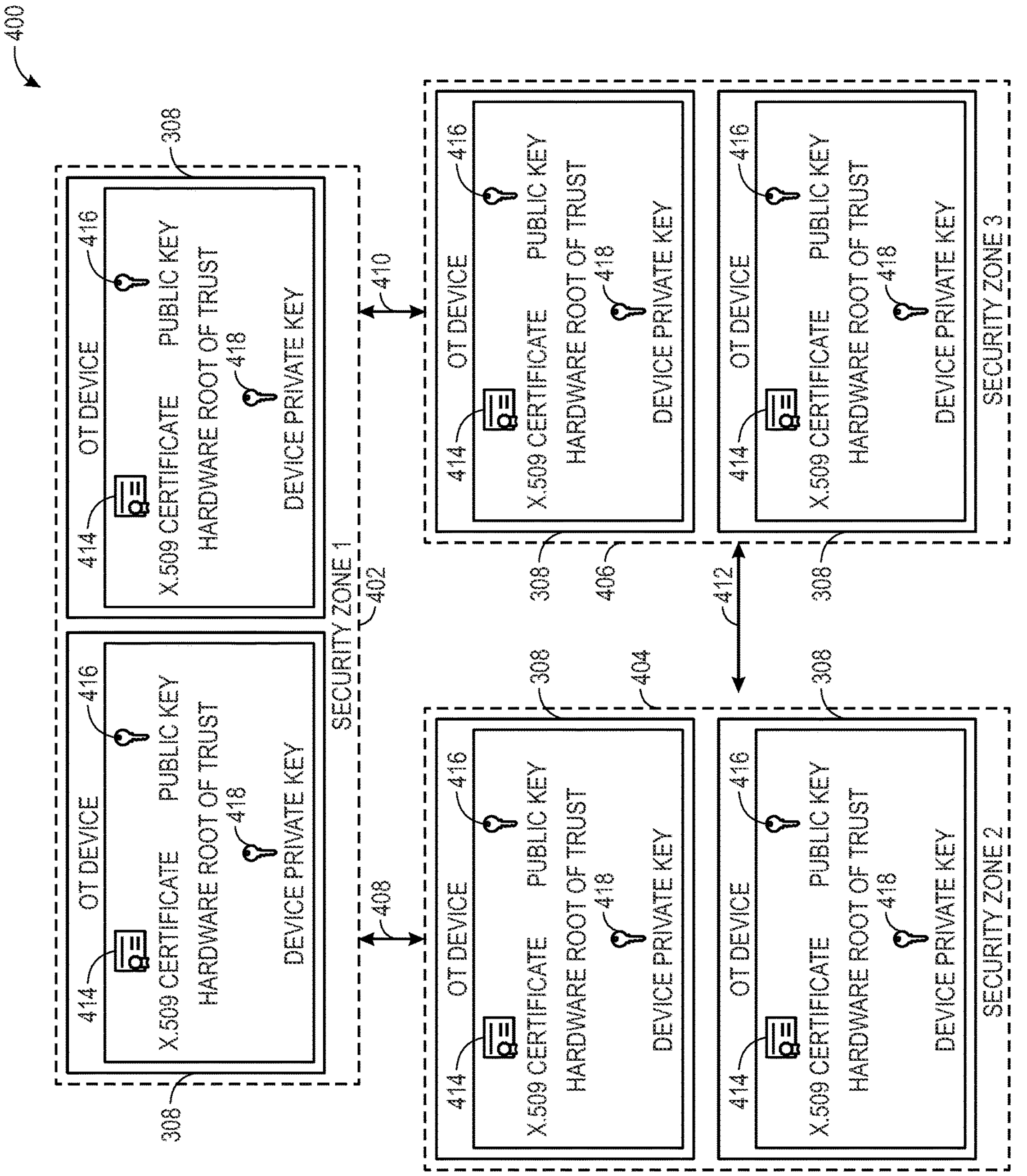
FIG. 5 is a schematic view of an embodiment of the industrial automation system of FIG. 1, disposed in an OT environment and including multiple OT devices, in accordance with an embodiment.

FIG. 5 is a schematic view of an industrial automation system 10 that is disposed in an OT environment 400 and includes multiple OT devices 308. Security policies for the OT devices 308 may be managed via a model-based security policy configuration system that may operate as a software application running on a computing device (not shown). The security policy configuration system maintains a model of the OT environment 400 that inventories the OT devices 308 and network infrastructure devices distributed throughout the OT environment 400, as well as networked interconnections and relationships between the various devices. The security policy configuration system may be configured to receive inputs from a user (e.g., via a user interface) defining groups of devices 308 that share a common security context into security zones 402, 404, 406, using an integrated modeling tool. Each security zone 402, 404, 406 includes one or more devices 308 that communicate with one another in a secure manner as the industrial automation system 10 operates, and which share common security requirements. OT devices 308 are allowed to communicate with other OT devices 308 within a common security zone 402, 404, 406, but generally prohibited from communicating with OT devices 308 outside the security zone 402, 404, 406 unless a conduit 408, 410, 412 has been defined to facilitate the communication (e.g., between a device 308 within the zone 402, 404, 406 and a device 308 outside the zone 402, 404, 406, between devices 308 within the zone 402, 404, 406 and another zone, or between the zone 402, 404, 406 and another zone 402, 404, 406, and so forth).

Once all of the OT devices 308 of an industrial automation system 10 in an OT environment 400 have been added to respective security zones 402, 404, 406 and any conduits 408, 410, 412 have been defined, the configuration system can implement a system-wide security policy based on the zone and conduit information defined by the user, as well as the system model. The configuration system translates the defined security policy into device-level security configuration instructions that may be downloaded or otherwise provided to the appropriate devices (e.g., network infrastructure devices and/or OT devices 308) in order to implement the defined security policy. This translation can be based on defined translation rules maintained by the configuration system. These translation rules can include vendor-specific rules capable of generating appropriate security configuration instructions for respective vendor-specific devices. In this way, the system hides or abstracts from the user the technical complexities associated with setting device-level security parameters. The configuration system also abstracts the cross-vendor or cross-product differences in technology required to enforce the security policy. Accordingly, the model-based security configuration system allows a user to easily create a security model for a collection of networked OT devices 308 disposed in an OT environment 400, which may then be used to generate device-specific security configuration instructions and set device security parameters for individual devices 308 on the network. The security model can be based on specific standards (e.g., IEC 62443), which recommend defining zones of trust within a given OT environment 400, such that OT devices 308 that are to be allowed to communicate securely and which share common security requirements are assigned to a common zone 402, 404, 406.

In general, each zone 402, 404, 406 is a grouping of logical or physical assets (e.g., OT devices 308) that share common security requirements. Devices (e.g., OT devices 308) within a common security zone 402, 404, 406 are to be allowed to exchange data with one another via secure communication channels, but are not permitted to communicate with devices that are not assigned to that zone 402, 404, 406 unless a channel or conduit 408, 410, 412 is defined. A channel is a specific logical or physical communication link between assets in two separate zones. A conduit (represented by lines 408, 410, 412) is a logical group of communication channels between two or more devices 308 and/or zones 402, 404, 406 that share common security requirements. For conduits, a boundary device 308 can be defined as a communication security asset (e.g., a network infrastructure device) that provides an interface between a zone 402, 404, 406 and a conduit 408, 410, 412. Modeling tools provided by the security configuration system described herein can allow communication links to be defined between two specified devices (as represented by line 408), between a specified device and a zone of devices (as represented by line 410), or between two zones (as represented by line 412).

Through interaction with a user interface, the security configuration system receives inputs from a user specifying a number of different trust types for communication between the user's collection of industrial assets. A zone trust type specifies that all assets (e.g., OT devices 308) within the same security zone will trust one another. This trust type is represented by the zones 402, 404, 406 depicted in FIG. 5. An asset-asset trust type specifies that an asset (OT device 308) in a first zone 402 will trust an asset (OT device 308) in a different second zone 404 as represented by line 408. An asset-zone trust type specifies that an asset (OT device 308) in a third security zone 406 will trust any asset (OT device 308) from a specified first zone 402, as represented by line 410. A zone-zone trust type specifies that any asset (OT device 308) from a specified second zone 412 is to trust all assets (OT devices 308) from a specified third zone 406, as represented by line 412. For asset-asset, asset-zone, and zone-zone trust types, the system can further allow the user to define whether the trust is to be a one-way trust (only communication in one direction is allowed) or a two-way trust.

As shown, the OT devices 308 may store (e.g., in local memory) one or more certificates 414, one or more public keys 416 (e.g., a PKI public key, a device public key, etc.), and/or one or more private keys 418 that corresponds to the one or more certificates 414. The one or more certificates 414 include a device identity certificate that identifies the device 308. Further, the device 308 may store one or more additional certificates 414 that may define, for example, one or more security zones and/or conduits in which the OT device 308 is authorized to operate. For example, each device 308 may store a separate certificate 414 for each security zone and/or conduits in which the device 308 is authorized to operate. Further, in some embodiments, the certificate 414 may identify other characteristics of operation that the OT device 308 is specifically authorized or not authorized to perform, other devices with which the OT device 308 may or may not communicate, who can control and/or modify the device, and so forth.

Figure 6:
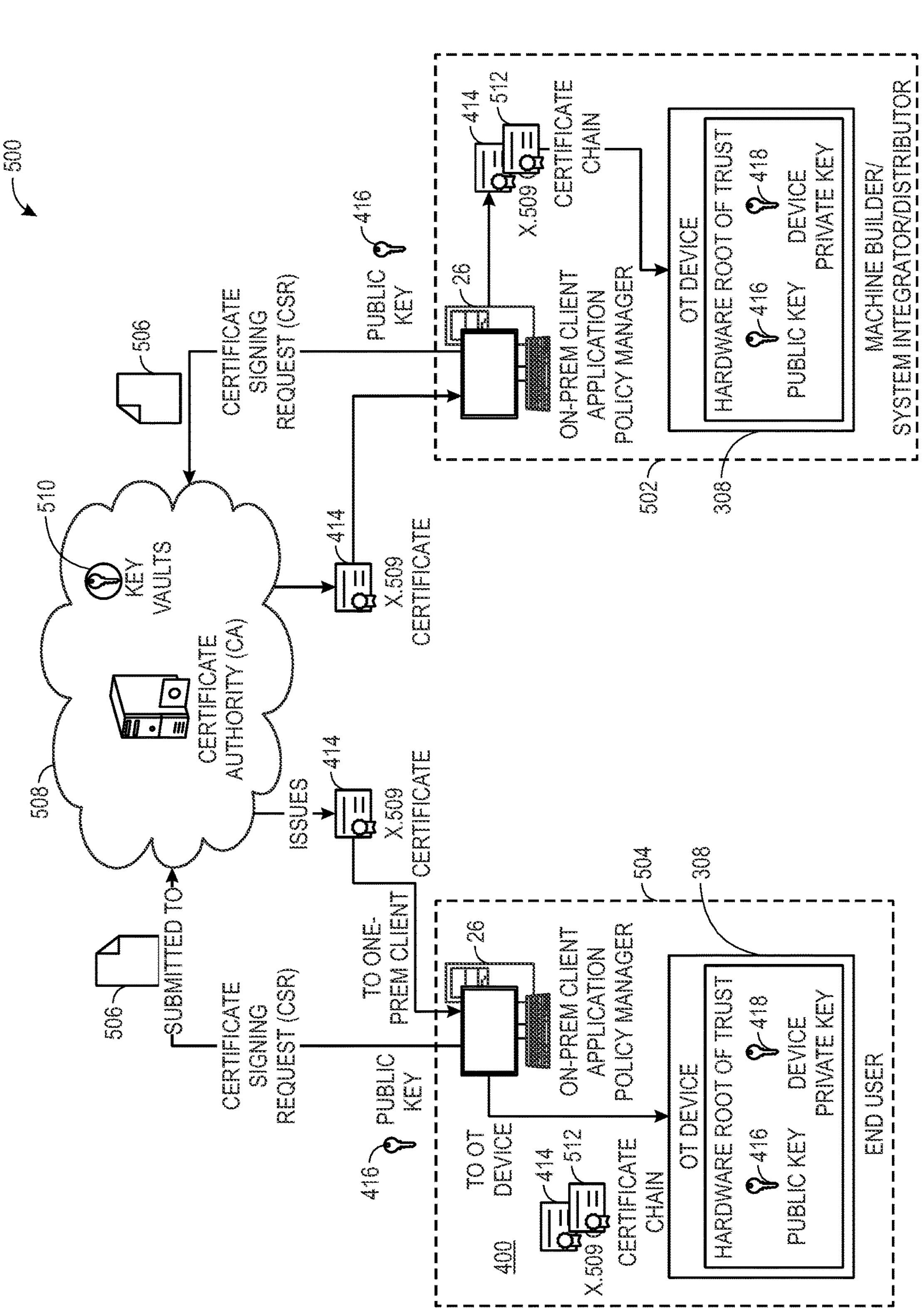
FIG. 6 is a schematic illustrating a public key infrastructure (PKI) for the OT devices shown in FIG. 5, in accordance with an embodiment.

FIG. 6 is a schematic illustrating a public key infrastructure (PKI) 500 for OT devices 308. A first party 502 (e.g., a machine builder, a system integrator, and/or a distributor) receives an order or a request for one or more OT devices 308 from a second party 504 (e.g., an end user). The order may include data indicative of one or more characteristics of the planned implementation or application for each of the one or more OT devices 308. For example, the order may indicate that the OT device 308 is intended to be installed in one or more particular zones and/or will be part of one or more conduits within an OT environment 400. As the machine builder 502 assembles the order and configures the one or more OT devices 308 included in the order, the machine builder 502 may use a software application (e.g., a policy manager application) running on a computing device 26 (e.g., a workstation, desktop computer, laptop computer, tablet, HMI, mobile device, edge device, container, cloud, etc.) to generate and transmit a certificate signing request 506 to a certificate authority 508, which may operate in the cloud or on a remote server. In some embodiments, the computing device may interact with a cloud-based application or an application running on a remote server to define one or more policies. The certificate signing request may be encrypted with a public key 416, which may or may not be transmitted to the certificate authority 508 along with the certificate signing request 506. The certificate signing request 506 may include characteristics of the planned implementation of the one or more corresponding OT devices 308. For example, the certificate signing request 506 may identify zones and/or conduits in which the corresponding OT devices 308 may be installed. The certificate signing request 506 may be generated in accordance with one or more standards, such as PKXS #10. Accordingly, the certificate signing request may include fields for name information, organization information, a public key (associated with the device, the PKI, and/or the certificate authority), a domain name, one or more digital signatures, and so forth.

Upon receipt of the certificate signing request 506 from the machine builder 502, the certificate authority 508 processes the certificate signing request 506. If the certificate signing request 506 was encrypted, the certificate authority 508 may use a private key (e.g., stored in a key vault 510) to decrypt the certificate signing request 506 in accordance with asymmetric encryption principles. Once the certificate signing request 506 is in a decrypted state, the certificate authority 508 verifies the information in the certificate signing request 506 (e.g., name information, organization information, public key, domain name, one or more signatures, etc.), which may include verifying that that certificate signing request was generated using a particular key. In some embodiments, verification of the information in the certificate signing request 506 may include referencing one or more data sources, such as databases, etc. Once the certificate authority 508 verifies the information in the certificate signing request 506, the certificate authority 508 generates a certificate 414. The certificate 414 may be generated based on a root certificate authority, which may be housed offline in a protected (e.g., air-gapped) environment. The certificate 414 may be an X.509 certificate, or a certificate 414 that complies with some other standard. In some embodiments, the certificate 414 may be digitally signed using a hash value generated using the certificate authority's 508 public key and verified based on the PKI public key stored in memory of the OT device. Additionally, in some embodiments, the whole certificate 414 may be encrypted using the OT device's 308 device public key. In such embodiments, a corresponding private key 418 stored in the device 308 (e.g., in memory) may be used the decrypt the encrypted certificate 414 using asymmetric encryption techniques. The private key 418 is securely protected and does not leave the device for any reason. In some embodiments, the private key 418 is generated by the device. In some embodiments, the private key 418 and the certificate 414 may be located in different areas of memory since the private key is securely stored while the certificate 414 is freely shared with any requesting party/device wishing to communicate with the device 308.

In some embodiments, the machine builder 502 may generate certificates 414 itself for OT devices 308 it provides to end users 504. In such an embodiment, the machine builder 502 may act as its own certificate authority, generating a certificate 414 in compliant with the relevant standards (e.g., X.509), allowing the end user 504 to operate the one or more OT devices 308 in accordance with the characteristics set forth in the order submitted by the end user 504. For example, the machine builder 502 may utilize an application running locally (e.g., on the computing device 26) or remotely (e.g., on a remote computing device, on a remote server, in the cloud, etc.) to generate a certificate 414 that may be digitally signed and/or encrypted, as described above. In other embodiments, the machine builder 502 may interface with the certificate authority 508 regarding characteristics of the certificate 414, but actually generate and/or digitally sign the certificate 414 itself. For example, in some embodiments, the machine builder 502 may transmit a certificate signing request 506 or equivalent specification/definition of a requested certificate 414 to the certificate authority 508. Upon receiving confirmation of the various characteristics of the certificate 414 from the certificate authority 508, the machine builder 502 may generate the certificate 414 based on the confirmed certificate characteristics.

Further, in some embodiments, the machine builder 502 may receive a certificate 414 from the certificate authority 508 via an application running on a local or remote computing device 26. The computing device 26 may then pass the certificate to the OT device 308, either directly, or via one or more intermediary devices (e.g., a workstation, desktop computer, laptop computer, tablet, HMI, mobile device, edge device, container, etc.). In such an embodiment, the computing device 26, and in some cases, each of the one or more intermediary devices, if any, may generate additional certificates (e.g., intermediary certificates), resulting in a certificate chain 512 that establishes the custody of the certificate 414.

Once the certificate 414 for an OT device 308 has been received or generated, the certificate 414, and in some cases the certificate chain 512, may be stored in the OT device 308 (e.g., in memory) along with a corresponding private key 418 that is securely stored in the OT device 308. In some embodiments, one or more intermediary gateway devices may validate and/or store the certificate chain and only pass the end node of the tertiary certificate from the chain. The corresponding device private key 418 may be used to decrypt the certificate 414 itself. If the certificate is signed, the authenticity of the hash value of the digital signature of the certificate 414 may be verified using the PKI public key stored in device memory.

With one or more certificates 414, one or more public keys 416, and the corresponding device private key 418 stored in memory of the device 308, the machine builder 502 may ship the OT device 308 to the end user 504, or some other party along the distribution chain, in a secure state. That is, the certificate(s) 414 stored on the OT device 308 may dictate certain characteristics of operation of the OT device 308, such as permitted zones/conduits, other devices with which the OT device 308 is permitted to communicate, and so forth, as determined by a by the security policy management engine and as set forth in the certificate 414 such that if the OT device 308 is intercepted or falls into another party's possession during transport, the capabilities of the OT device 308 will be limited. Accordingly, the certificate 414 may be used by the machine builder 502 or other parties along the supply chain, such as system integrators, distributors, maintenance/service providers, etc. to retain certain rights in the OT device 308. For example, the machine builder may provision a zone or conduit with which the end user 504 or other parties are not authorized to interact. In other embodiments, the machine builder 502 may generate certificates 414 to define multiple access levels that may be enforced via separate security zones and/or conduits.

The one or more OT devices 308 may be received by the end user 504 and installed in one or more zones and/or along one or more conduits consistent with the order and/or the certificate 414 stored on the OT device 308. A policy manager running on local computing resources may or may not validate the certificate 414 before the OT device 308 begins operation in the OT environment 400. During operation, as previously described with regard to FIG. 5, the OT device 308 may only be permitted to communicate with other devices in the same zone and/or along the same conduit. For example, other devices in the same zone or along the same conduit as the OT device 308 may refuse to communicate and/or cooperate with the OT device 308 unless the OT device 308 provides and proves ownership of a valid certificate 414 to establish trust with that particular zone, conduit, or device, and/or performs an asymmetric cryptographic handshake using its corresponding private key 418 to establish trust. Further, in some embodiments, the policy manager application or other components in the OT environment 400, such as a policy enforcement application or policy enforcement device, may prohibit the OT device 308 from performing operations that are outside of the scope of the certificate 414 stored on the OT device 308. For example, the certificate 414 may be referenced by a policy manager application to determine other devices with which the OT device 308 can communicate, who is authorized to use and/or modify the OT device 308, and so forth.

Certificates 414 may be issued by the certificate authority 508 with an expiration date. For example, a certificate 414 may be configured to expire on a specific date (e.g., at the end of the calendar year) or after a set period of time has elapsed (e.g., one-year from issuance). Once a certificate 414 is approaching expiration (e.g., within a threshold number of hours, days, weeks, months, etc. of expiration), has expired, or has been revoked, the end user 504 may use the computing device 26 running the policy manager application to request a new certificate 414 or a renewal of the existing certificate 414. In some embodiments, the PKI 500 as a service, provided via the policy manager application, may be configured to provide reminders to renew certificates 414 or request new certificates 414 when existing certificates 414 are nearing expiration. Accordingly, similar to the certificate 414 obtained by the machine builder 502, the end user 504 may transmit, via the policy manager application, a certificate signing request 506 and, in some cases, one of the public keys 416 stored on the OT device 308 to the certificate authority 508 requesting a new certificate 414 or renewal of the existing certificate 414.

In some embodiments, the certificate authority 508 may be configured to enforce role-based access controls, such that only authorized users are allowed to set policies and monitor the statuses of certificates 414. The certificate authority 508 may exist in the cloud, but may be based on a root certificate authority housed offline in a secure fashion. Upon confirmation of the certificate signing request 506 for the new or renewed certificate 414 and the public key 416, which may include verification that the certificate signing request 506 was generated with a particular key, the certificate authority 508 confirms the certificate 414 and issues a new or renewed certificate 414 to the on-prem client application.

If the certificate signing request 506 cannot be confirmed/verified by the certificate authority 508, the certificate 414 is not renewed, a new certificate 414 is not issued, and the existing certificate 414 is allowed to expire. Further, if the certificate authority 508 determines that trust has been lost (e.g., at the request of an administrator, for example if a device has been replaced, damages, or is being decommissioned, based upon specific suspicious activities being detected, such as too many login attempts, an unexpected change, etc.), the certificate authority 508 may revoke the certificate 414 before the certificate 414 expires. Once the certificate 414 expires or is revoked, the other OT devices 308 in the same zone and/or conduit as the OT device 308 may refuse to communicate with the OT device 308 or may limit communication with the OT device 308 until a valid certificate 414 is obtained. In some embodiments, the use of an OT device 308 with an expired certificate 414 may result in reduced capability and/or security event notices notifying the end user 504 of the expired certificate 414, but giving the end user 504 the option to continue operating the OT device 308.

In some embodiments, the on-prem policy manager application acts as an intermediary in the certificate chain by receiving the certificate 414 from the certificate authority 508 and transmitting the certificate 414 to the OT device 308. As such, the on-prem policy manager application may be periodically synchronized or otherwise share a sense of time with the certificate authority 508 in order to identify when certificates 414 are valid, nearing expiration, have expired, and/or have been revoked. In some embodiments, the on-prem policy manager application may issue an additional certificate to establish the certificate chain 512. Though the on-prem policy manager application is described as being a single intermediary between the OT device 308 and the certificate authority 508, it should be understood that, in some cases, there may be multiple intermediaries (e.g., multiple on-prem client applications running on one or more devices) between the OT device 308 and the certificate authority 508. Further, if the OT device 308 is connected to the cloud, the OT device 308 may be capable of direct communication with the certificate authority 508. In such cases, the on-prem policy manager application may run on the OT device 308 itself.

Though there are two parties 502, 504, depicted in the PKI 500 of FIG. 6, it should be understood that this is merely for simplicity and that the PKI 500 may be used by multiple parties along the supply chain. Accordingly, the PKI 500 may be provided to machine builders 502, system integrators, distributors, end users 504, service providers, maintenance providers, and other parties along the supply chain as a service to facilitate the transfer of ownership, custody, and/or other rights in an OT device 308 between multiple parties. Further, though the scenario described above includes a machine builder 502, an end user 504, and, in some cases, one or more intervening parties, it should be understood that these techniques may be utilized to include other parties in the distribution chain, such as distributors, integrators, installers, shippers, service providers, etc. In the event of encryption being broken (e.g., via a hack, loss of a private key, or by a quantum computer via a "quantum apocalypse"), certain cryptographic algorithms being found insufficiently secure, the PKI 500 as a service may be utilized to coordinate rapid certificate updates and deployments across enterprise fleets to secure OT devices 308.

Figure 7:
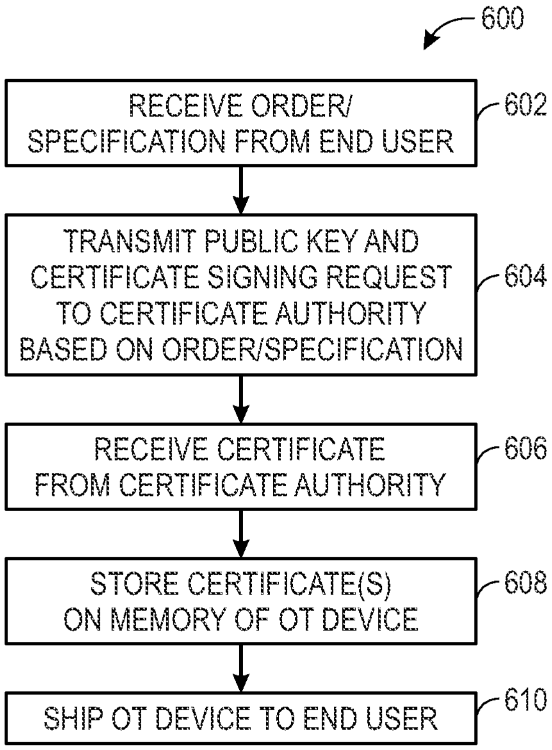
FIG. 7 is a flow chart of a process for provisioning the OT devices of FIG. 5 using the PKI of FIG. 6, from the perspective of a machine builder, system integrator, or distributor, in accordance with an embodiment.

FIG. 7 is a flow chart of a process 600 for provisioning one or more OT devices from the perspective of a machine builder, system integrator, distributor (e.g., vendor), or other party that is not the end user. At block 602, an order for one or more OT devices and/or specifications for one or more OT devices are received from an end user. The order or specification may include data indicative of one or more characteristics of the planned implementation for each of the one or more OT devices, such as identification of one or more security zones in which the OT device will be installed, one or more conduits to which the OT device may have access, one or more operations or functions the OT device will perform, one or more intended recipients and/or authorized users, other devices the OT device will be configured to communicate, one or more users, operators, and/or administrators that will have permission to use, control, and/or make changes to the OT device, and so forth.

At block 604, a public key and certificate signing request are transmitted to a certificate authority based on the order/specification. As the order is assembled and one or more OT devices in the order are configured, a software application (e.g., a policy manager application) running on a computing device (e.g., a workstation, desktop computer, laptop computer, tablet, HMI, mobile device, edge device, container, etc.) may be used to generate and transmit the certificate signing request to the certificate authority. As previously described, the certificate signing request may be encrypted with a public key, which may be transmitted to the certificate authority along with the certificate signing request. The certificate signing request may be generated in accordance with one or more standards, such as PKXS #10. Accordingly, the certificate signing request may include information, such as name information, organization information, a public key (associated with the device or the certificate authority), a domain name, one or more signatures, as well as characteristics of the planned implementation of one or more corresponding OT devices, such as zones and/or conduits in which the corresponding OT devices may be installed.

If the certificate signing request is received in an encrypted state, the certificate authority may use a corresponding private key to decrypt the certificate signing request. Upon receipt of the certificate signing request, the certificate authority verifies the information in the certificate signing request, and in some cases that the certificate signing request was generated using a particular key. In some embodiments, verification of the information in the certificate signing request may include referencing one or more data sources, such as databases, etc. Once the information in the certificate signing request has been verified, the certificate authority generates the requested certificate, which may be an X.509 certificate, or a certificate that complies with some other standard. The certificate may be generated based on a root certificate authority, which may be housed offline in a protected (e.g., air-gapped) environment. In some embodiments, the certificate may be digitally signed using a hash value generated using the certificate authority's public key. Further, the whole certificate may be encrypted using the device's public key.

At block 606 the certificate is received from the certificate authority. If the certificate is encrypted, a corresponding private key stored in the device (e.g., in memory) may be used the decrypt the encrypted certificate. In some embodiments, the machine builder, system integrator, distributor, or other party along the distribution chain may generate certificates itself for OT devices it provides to end users. In such embodiments, blocks 604 and 606 may be omitted and replaced with a block for generating a certificate for the OT device. For example, the machine builder, system integrator, distributor, or other party along the distribution chain may utilize an application running locally or remotely (e.g., on a remote computing device, on a remote server, in the cloud, etc.) to generate a certificate that may be digitally signed and/or encrypted, as described above. In other embodiments, the machine builder, system integrator, distributor, or other party along the distribution chain may interface with the certificate authority regarding characteristics of the certificate, but actually generate and/or digitally sign the certificate itself. For example, in some embodiments, the machine builder, system integrator, distributor, or other party along the distribution chain may transmit a certificate signing request (block 604) or equivalent specification/definition of a requested certificate to the certificate authority. Upon receiving confirmation of the various characteristics of the certificate from the certificate authority, the machine builder may generate the certificate based on the confirmed certificate characteristics.

Further, in some embodiments, the machine builder may receive a certificate from the certificate authority via an application running on a local or remote computing device. The computing device may then pass the certificate to the OT device, either directly, or via one or more intermediary devices (e.g., a workstation, desktop computer, laptop computer, tablet, HMI, mobile device, edge device, container, etc.). In such an embodiment, the computing device, and in some cases, each of the one or more intermediary devices, if any, by generating additional certificates, resulting in a certificate chain that establishes the custody of the certificate.

At block 608, the received certificate(s) are stored on the OT device (e.g., in memory). The corresponding device private key already stored in memory may be used to decrypt the certificate itself. Further, the PKI public key stored in memory of the device may be used to verify the hash value of the digital signature of the certificate to verify its authenticity.

At block 610, the OT device is shipped to the end user in a secure state. That is, the certificate stored on the OT device may dictate certain characteristics of operation of the OT device, such as permitted zones/conduits, other devices with which the OT device is permitted to communicate, and so forth, as determined by a by a security policy management engine utilized by the end user and as set forth in the certificate such that if the OT device is intercepted or falls into another party's possession during transport, the capabilities of the OT device will be limited. Accordingly, the certificate may be used by parties along the supply chain, such as machine builders, system integrators, distributors, maintenance/service providers, etc. to retain certain rights in the OT device. For example, the machine builder may provision a zone or conduit with which the end user or other parties are not authorized to interact. In other embodiments, the machine builder may generate certificates to define multiple access levels that may be enforced via separate security zones and/or conduits.

Figure 8:
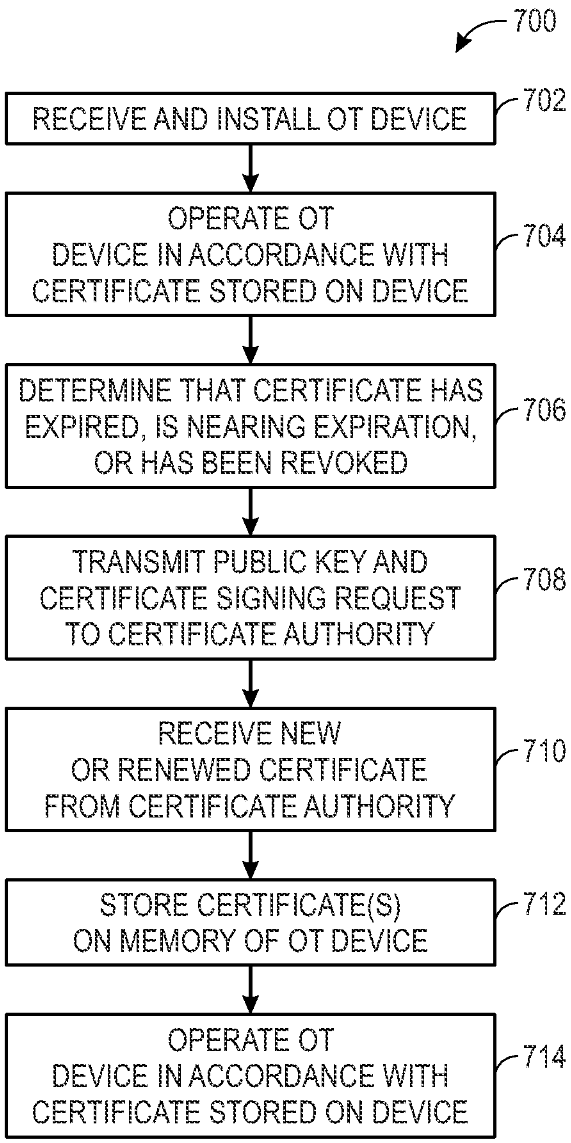
FIG. 8 is a flow chart of a process for operating the OT devices of FIG. 5, and renewing certificates or obtaining new certificates when certificates expire using the PKI of FIG. 6, in accordance with an embodiment.

FIG. 8 is a flow chart of a process 700 for operating OT devices and renewing certificates or obtaining new certificates when certificates expire or have been revoked. At block 702, the OT device is received and installed in an OT environment. For example, the OT device may be installed in one or more zones and/or along one or more conduits consistent with the certificate stored on the device. A policy manager application running on local computing resources may or may not validate the certificate before the OT device begins operation in the OT environment. During operation, the OT device may only be permitted to communicate with other devices in the same zone and/or along the same conduit. For example, other devices in the same zone or along the same conduit as the OT device may refuse to communicate and/or cooperate with the OT device unless the OT device provides and proves ownership of a valid certificate to establish trust with a particular zone, conduit, or device, and/or performs an asymmetric cryptographic handshake using its corresponding private key to establish trust with the other devices. In some embodiments, a policy enforcement point, such as a policy enforcement application or policy enforcement device may prohibit the OT device from performing operations that are outside of the scope of its certificate. For example, the certificate may be referenced by a policy manager application to determine other devices with which the OT device can communicate, who is authorized to use and/or modify the OT device, and so forth.

In some embodiments, the on-prem policy manager application acts as an intermediary in the certificate chain by receiving the certificate from the certificate authority and transmitting the certificate to the OT device. As such, the on-prem policy manager application may be periodically synchronized or otherwise share a sense of time with the certificate authority in order to identify when certificates are valid, nearing expiration, have expired, and/or have been revoked. Further, if the OT device is connected to the cloud, the OT device may be capable of direct communication with the certificate authority. In such cases, the on-prem policy manager application may run on the OT device itself.

At block 706, a determination is made that the certificate for the OT device has expired, is approaching expiration, or has been revoked. Certificates may be issued by the certificate authority with an expiration date. For example, a certificate may be configured to expire on a specific date (e.g., at the end of the calendar year) or after a set period of time has elapsed (e.g., one-year from issuance). Once a certificate is within a threshold time of expiration (e.g., within a threshold number of hours, days, weeks, months, etc. of expiration) or has expired, the policy manager application may provide a notification to the end user that the certificate has expired or is approaching expiration and should be renewed.

At block 708, the public key and certificate signing request may be transmitted to the certificate authority to request a new certificate or a renewal of the existing certificate. As previously described, the certificate signing request may be encrypted with a public key, which may be transmitted to the certificate authority along with the certificate signing request. The certificate signing request may be generated in accordance with one or more standards, such as PKXS #10. Accordingly, the certificate signing request may include information, such as name information, organization information, a public key (associated with the device or the certificate authority), a domain name, one or more signatures, as well as characteristics of the planned implementation of one or more corresponding OT devices, such as zones and/or conduits in which the corresponding OT devices may be installed. If the certificate signing request is received in an encrypted state, the certificate authority may use a corresponding private key to decrypt the certificate signing request. Upon receipt of the certificate signing request, the certificate authority verifies the information in the certificate signing request. In some embodiments, the certificate authority may verify that the certificate signing request was generated using a particular key. Once the information in the certificate signing request has been verified, the certificate authority generates the requested new or renewed certificate based on a root certificate authority, which may be housed offline in a protected (e.g., air-gapped) environment. In some embodiments, the certificate may be digitally signed using a hash value generated using the certificate authority's public key and or the whole certificate may be encrypted using the device's public key.

At block 710, the new or renewed certificate is received from the certificate authority. If the certificate is encrypted, a corresponding private key stored in the device (e.g., in memory) may be used the decrypt the encrypted certificate. In some embodiments, the end user may generate certificates itself for OT devices it operates. In such embodiments, blocks 708 and 710 may be omitted and replaced with a block for generating a new or renewed certificate for the OT device. For example, the end user may utilize an application running locally or remotely (e.g., on a remote computing device, on a remote server, in the cloud, etc.) to generate a certificate that may be digitally signed and/or encrypted, as described above. In other embodiments, the end user may interface with the certificate authority regarding characteristics of the certificate, but actually generate and/or digitally sign the certificate itself. For example, in some embodiments, the end user may transmit a certificate signing request (block 708) or equivalent specification/definition of a requested certificate to the certificate authority. Upon receiving confirmation of the various characteristics of the certificate from the certificate authority, the end user may generate the certificate based on the confirmed certificate characteristics.

In some embodiments, the end user may receive a certificate from the certificate authority via a policy manager application running on a local or remote computing device. The computing device may then pass the certificate to the OT device, either directly, or via one or more intermediary devices (e.g., a workstation, desktop computer, laptop computer, tablet, HMI, mobile device, edge device, container, etc.). In such an embodiment, the computing device, and in some cases, each of the one or more intermediary devices, if any, by generating additional certificates, resulting in a certificate chain that establishes a chain of custody for the certificate.

At block 712, the received new or renewed certificate(s) and the corresponding device private key are stored on the OT device (e.g., in memory). The corresponding device private key may be used to decrypt the certificate itself. Further, the PKI public key stored in memory of the device may be used to verify the hash value of the digital signature of the certificate to verify its authenticity. At block 714, the OT device may be operated in accordance with the new or renewed certificate(s) stored in memory until the new or renewed certificate expires, nears expiration, is revoked, etc.

The present patent application is directed to a cloud-based public key infrastructure (PKI) managed by a third party (e.g., Rockwell Automation via a cloud hosted service, such as FactoryTalk Hub) and provided as a service. A machine builder (e.g., manufacturer of industrial equipment) or system integrator can provision industrial equipment for its intended use (e.g., tied to one or more particular zones and/or conduits) based on inputs provided by the end user when the order is placed. The machine builder can obtain a certificate (e.g., an X.509 certificate) from a certificate authority by sending a certificate signing request and a public key to the certificate authority or generate, via its own certificate authority, a certificate. The certificate may be referenced by a policy platform to determine other devices with which the industrial device can communicate, who can use and/or modify the industrial device, and so forth. For example, the certificate may define a zone or conduit including multiple industrial devices that share certificates. In some cases, the certificate may be used by the device manufacturer, or some other party in the distribution chain, such as a distributor, integrator, service provider, etc. to retain certain rights in the industrial device. For example, the machine builder may provision a zone or conduit with which the end user or other parties are not authorized to interact. In other embodiments, the machine builder may generate certificates to define multiple access levels that may be enforced via separate security zones and/or conduits. The certificate may be configured to expire on a set expiration date or after a set period of time has elapsed (e.g., a year from issuance, at the end of the calendar year, etc.). Accordingly, the certificate must be renewed or a new certificate obtained to use the industrial device after the certificate expires or has been revoked. The certificate may be stored on the industrial device along with a corresponding private key. The industrial device can then be transported to the end user in a secure state (e.g., the industrial device may only be used in accordance with the zones and/or conduits determined by the security policy management engine and set forth in the certificate).

Once the industrial device arrives at the end user, the end user can install and use the industrial device in a zone and/or conduit that is consistent with the certificate. For example, the industrial device may be allowed to communicate with certain other devices within a zone and/or conduit and/or perform certain operations that are consistent with the certificate. Upon installation of the industrial device or expiration of the existing certificate, an on-prem client application may be configured to transmit a certificate signing request, along with a public key associated with the device, to the certificate authority requesting a new certificate or renewal of the existing certificate. The certificate authority enforces role-based access controls, enabling authorized users to set policies and monitor certificate status and may be based on a root certificate authority housed offline. The certificate authority confirms the certificate signing request, that the certificate signing request was generated with the private key associated with the public key, and, in some cases, the public key itself, and issues a certificate to the on-prem client application. If the existing certificate is not renewed and a new certificate is not issued, the existing certificate is allowed to expire. Further, if trust is lost, the certificate authority may revoke the certificate before the certificate expires. Once the certificate expires or is revoked, the other industrial devices in the zone and/or conduit as the industrial device may refuse to communicate with the industrial device or may limit communication with the industrial device until a valid certificate is obtained. In some embodiments, the use of an industrial device with an expired certificate may result in security event notices notifying an end user of the expired certificate, but giving the end user the option to continue operating the industrial device. Further, in some cases, the PKI as a service may be configured to provide reminders to renew certificates or request new certificates when existing certificates are nearing expiration.

The on-prem client application acts as an intermediary in the certificate chain by receiving the certificate from the certificate authority and transmitting the certificate to the industrial device. As such, the on-prem client application may be synchronized or otherwise share a sense of time with the certificate authority in order to identify when certificates are valid, have expired, or have been revoked. In some cases, the on-prem client application may issue an additional certificate. Though the on-prem client application is described as being a single intermediary between the industrial device and the certificate authority, it should be understood that, in some cases, there may be multiple intermediaries (e.g., multiple on-prem client applications running on one or more devices) between the industrial device and the certificate authority. Correspondingly, if the industrial device is connected to the cloud, the industrial device may be capable of direct communication with the certificate authority. In such cases, the on-prem client application may run on the industrial device itself.

The cloud-based PKI as a service may be utilized to facilitate the transfer of ownership, custody, and/or other rights in an industrial device between multiple parties. Further, though the scenario described above includes a machine builder, an end user, and, in some cases, one or more intervening parties. It should be understood that these techniques may be utilized to include other parties in the distribution chain, such as distributors, integrators, installers, shippers, service providers, etc. In the event of encryption being broken (e.g., via a hack, loss of a private key, or by a quantum computer via a "quantum apocalypse"), certain cryptographic algorithms being found insufficiently secure, the PKI as a service may be utilized to coordinate rapid certificate updates and deployments across enterprise fleets. The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:

processing circuitry; and a memory, accessible by the processing circuitry, the memory storing instructions that, when executed by the processing circuitry, cause the processing circuitry to execute an on-premise policy manager application and perform operations comprising:

synchronizing a time with a cloud-based certificate authority;

determining, based on the synchronized time, that a certificate stored on an operational technology (OT) device operating in an OT environment has expired or is within a threshold period of time from expiration;

generating a certificate signing request for a new certificate for the OT device;

transmitting the certificate signing request and a public key stored in a second memory of the OT device to the cloud-based certificate authority, wherein the cloud-based certificate authority is configured to enforce role-based access controls to verify the certificate signing request;

receiving the new certificate from the cloud-based certificate authority; and transmitting the new certificate to the OT device for storage in the second memory.

2. The system of claim 1, wherein the certificate identifies one or more security zones of the OT environment in which the OT device is authorized to operate, one or more conduits of the OT environment in which the OT device is authorized to operate, or both.

3. The system of claim 1, wherein the operations comprise generating an additional certificate and transmitting the additional certificate to the OT device along with the new certificate, wherein the new certificate and the additional certificate form a certificate chain configured to establish a chain of custody for the new certificate.

4. The system of claim 1, wherein the certificate signing request comprises identification of a name, identification of an organization, identification of the public key, identification of a domain name, one or more digital signatures, or any combination thereof.

5. The system of claim 1, wherein the operations comprise:

verifying, via the policy manager application executing on the processing circuitry, before initial operation of the OT device in the OT environment, the certificate stored on the OT device; and operating the OT device within the OT environment in accordance with the certificate stored on the OT device.

6. The system of claim 1, comprising the OT device.

7. The system of claim 1, wherein the certificate is configured to expire upon a passage of a particular amount of time from issuance.

8. The system of claim 1, wherein the certificate is configured to expire at a particular time on a particular date.

9. The system of claim 1, wherein the certificate signing request comprises a PKXS #10 certificate signing request.

10. The system of claim 1, wherein the certificate comprises a X.509 certificate.

11. A method, comprising:

synchronizing a time with a cloud-based certificate authority;

determining, based on the synchronized time, that a certificate stored on an operational technology (OT) device operating in an OT environment has expired or is within a threshold period of time from expiration;

generating a certificate signing request for a new certificate for the OT device;

transmitting the certificate signing request and a public key stored in a second memory of the OT device to the cloud-based certificate authority, wherein the cloud-based certificate authority is configured to enforce role-based access controls to verify the certificate signing request;

receiving the new certificate from the cloud-based certificate authority; and transmitting the new certificate to the OT device for storage in the second memory.

12. The method of claim 11, wherein the certificate identifies one or more security zones of the OT environment in which the OT device is authorized to operate, one or more conduits of the OT environment in which the OT device is authorized to operate, or both.

13. The method of claim 11, comprising generating an additional certificate and transmitting the additional certificate to the OT device along with the new certificate, wherein the new certificate and the additional certificate form a certificate chain configured to establish a chain of custody for the new certificate.

14. The method of claim 11, comprising:

verifying, via a policy manager application executing on processing circuitry, before initial operation of the OT device in the OT environment, the certificate stored on the OT device; and operating the OT device within the OT environment in accordance with the certificate stored on the OT device.

15. The method of claim 11, wherein the certificate is configured to expire upon a passage of a particular amount of time from issuance or a particular time on a particular date.

16. A non-transitory computer readable medium storing instructions that, when executed by processing circuitry, cause the processing circuitry to perform operations comprising:

determining that a certificate stored on an operational technology (OT) device operating in an OT environment has expired, wherein the certificate defines a security zone or a conduit in which the OT device is authorized to communicate with other OT devices;

limiting communication between the OT device and the other OT devices within the security zone or the conduit such that the OT device operates in a reduced capability state due to the expired certificate;

generating a certificate signing request for a new certificate for the OT device;

transmitting the certificate signing request and a public key stored in a second memory of the OT device to a certificate authority;

receiving the new certificate from the certificate authority; and transmitting the new certificate to the OT device for storage in the second memory, wherein the new certificate restores communication between the OT device and the other OT devices within the security zone or the conduit.

17. The non-transitory computer readable medium of claim 16, wherein the operations comprise generating an additional certificate and transmitting the additional certificate to the OT device along with the new certificate, wherein the new certificate and the additional certificate form a certificate chain configured to establish a chain of custody for the new certificate.

18. The non-transitory computer readable medium of claim 16, wherein the operations comprise:

verifying, via a policy manager application executing on the processing circuitry, before initial operation of the OT device in the OT environment, the certificate stored on the OT device; and operating the OT device within the OT environment in accordance with the certificate stored on the OT device.

19. The non-transitory computer readable medium of claim 16, wherein the certificate signing request comprises a PKXS #10 certificate signing request.

20. The non-transitory computer readable medium of claim 16, wherein the certificate comprises a X.509 certificate.

* * * * *